May 12, 1964

G. L. BEERS 3,133,139

DIRECTIONAL GLARE REDUCING VIEWING DEVICE

Filed May 19, 1958

INVENTOR.
George L. Beers
BY
George T. Craig
ATTORNEY.

INVENTOR.
George L. Beers
BY
George T. Craig
ATTORNEY.

United States Patent Office 3,133,139
Patented May 12, 1964

3,133,139
DIRECTIONAL GLARE REDUCING VIEWING
DEVICE
George L. Beers, 410 Peyton Ave., Haddonfield, N.J.
Filed May 19, 1958, Ser. No. 736,284
20 Claims. (Cl. 88—1)

The present invention relates to viewing devices, and more particularly to viewing devices which are effective to eliminate the blinding effect of an intense light source when a scene is viewed directly or by reflection. The invention is especially applicable to minimizing such blinding effects in connection with the operation of a vehicle.

Viewing devices of the prior art, vehicle rear view mirrors and sun visors, for example have not been satisfactory under driving conditions varying between full daylight and darkness. In the case of the rear view mirror, reflections from the brightwork of a following vehicle or the beam from its headlight are frequently of such an intensity as to interfere seriously with the performance of the vehicle driver. This problem becomes much more serious as the height of vehicles is reduced. Efforts to minimize the effects of these intense light sources have been ineffective. Certain types of rear view mirrors have been advocated which have a "day" and "night" control. In the "day" condition the mirror functions in the manner of a conventional rear view mirror. In the "night" condition the intensity of the reflected image is greatly reduced to avoid the blinding effect from the headlights of a following vehicle. While the blinding effect is avoided, the intensity of the image has necessarily been reduced to such an extent that all that can be seen in the mirror in the "night" condition is two spots of light from the headlights of a car to the rear. In order to obtain any other information from a rear view mirror of this type, it is necessary to operate the control and place the mirror in the "day" condition. The operation of the "day," "night" control where considerable traffic is encountered at night is impractical with the result that the operator of the vehicle either leaves the mirror in the "day" condition and tolerates the blinding effect of headlights or he leaves the mirror in the "night" condition and accepts the inconvenience of being unable to see anything in the rear view mirror but headlights.

In the daytime the sun shining directly into the eyes of the operator of a vehicle likewise causes a blinding effect which can seriously interfere with his performance. The "wrap around" windshields in modern cars have increased the angle through which the sun can shine in the eyes of the vehicle driver. Sun visors of the opaque type block out the direct rays of the sun, but in doing so they restrict the range of vision of the vehicle's operator in other areas than that from which the sun's rays are coming. Translucent types have been employed which reduce the intensity of the light from the sun, but they too greatly restrict the vision of the vehicle driver.

In accordance with the present invention, there are provided viewing devices which have directional properties that are effective in avoiding the blinding effects of intense light sources and which at the same time permit much more ideal viewing conditions than the devices heretofore utilized. In conjunction with the rear view mirror a directional viewing device is employed in a special manner which enables the operator of a vehicle through a slight change in his position to either see images in the normal manner or to have no light from the rear view mirror reach his eyes so that all blinding effects from headlights to the rear are avoided. By taking intermediate positions, the vehicle operator can control the intensity of the image reflected by the mirror.

The sun visor of the present invention likewise employs a directional viewing device of unique design. The sun visor is arranged to rotate about both a horizontal and a vertical axis. The directional viewing device for the sun visor in accordance with the present invention consists of a plurality of light transmitting elements which have predetermined viewing angles. In one position of the sun visor, the operator of a vehicle can see through the light transmitting elements of which it is composed in an essentially unrestricted manner. If from this position the sun visor is rotated in a horizontal plane about its vertical axis the light transmitting elements at the end furthest from the axis becomes opaque as viewed by the driver of the vehicle. Further rotation of the sun visor causes the opaque area to increase until the entire area is opaque and light is prevented from passing therethrough to the eyes of the driver. Thus by rotating the sun visor through a predetermined angle any desired portion of its area beginning at one end can be made opaque thus preventing intense light from a source such as the sun from reaching the eyes of the vehicle operator and at the same time permitting him to see through the remainder of the sun visor area. By this means intense sunlight can be blacked out and the vehicle operator provided with a much greater range of vision than with conventional devices.

Another important property of the present invention is that the directional properties incorporated in the novel viewing devices make it possible when viewing scenes therethrough to prevent scattered light from reaching the eyes of the viewer and thus the contrast in the scene and the saturation of colored objects is substantially improved. This reduction in scattered light from the sky and other objects minimizes eye strain encountered when operating a vehicle for long periods of time.

The principal object of the present invention is to provide a directional light transmitting device for viewing a scene or object, the transmission of light therethrough for viewing a scene being controlled by either varying the position of the viewer with respect to the device or varying the position of the device with respect to the viewer.

Another object of the present invention is to provide a viewing device of the character stated above in which the transmission of light therethrough can be controlled uniformly over the area of the device.

Still another object of the invention is to provide a viewing device in which the transmission of light therethrough can be controlled selectively in one area of the device with respect to another area of the device.

A further object of the present invention is to provide a combined rear view mirror and directional viewing device the intensity of the image as viewed therefrom being controllable progressively.

A still further object of the present invention is to provide a light shielding device having glare preventive properties, the light shielding area, if desired, being progressively changeable.

A still further object of the present invention is to provide a directional viewing device which excludes scattered light and improves the clarity and contrast of scenes viewed therethrough.

A still further object of the present invention is to provide a combined rear view mirror and directional viewing device having glare preventive properties.

Other objects and advantages of the present invention will, of course, become apparent and immediately suggest themselves to those skilled in the art to which the invention is directed from a reading of the following specification in connection with the accompanying drawing in which.

Referring to FIGS. 1 to 5 of the drawing, the interior front portion of a vehicle is shown. An automobile is selected as the vehicle for illustrative purposes and comprises a windshield 10, a seat 11 and an instrument panel 12. Reference character 14 indicates a seated figure, the driver of the vehicle, located in a position to use the vehicle rear view mirror 16.

Figure 1:
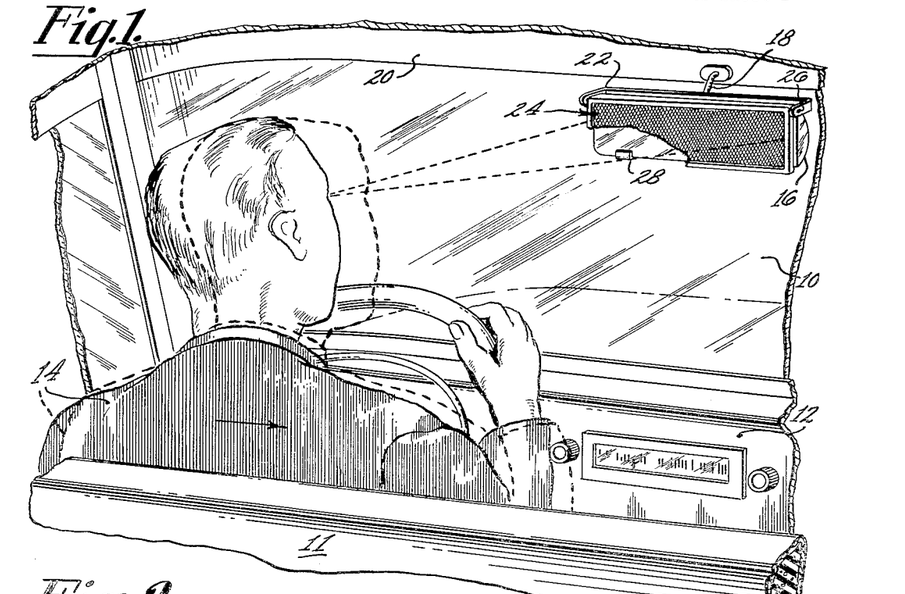
FIG. 1 is a pictorial showing of a rear view mirror combination embodying the invention in use.
Figure 2:
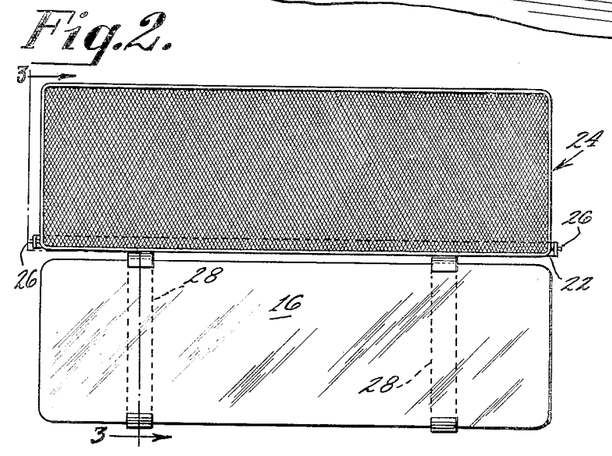
FIG. 2 is a view in front elevation of the mirror combination of FIG. 1.
Figure 3:
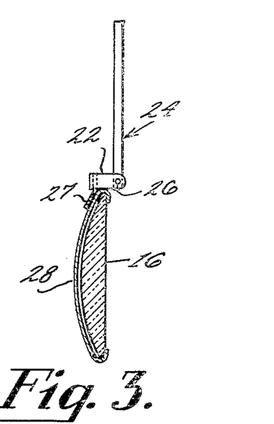
FIG. 3 is a view in sectional side elevation of the mirror combination of FIG. 1.

The mirror 16 is mounted on a support 18 in the form of a bracket secured to the top rail 20 of the windshield 10. A supporting member or bracket 22 serves as the connection to a directional viewing device 24. The latter is constructed in accordance with the present invention and functions in a manner to be explained below. It comprises a cellular structure surrounded by a suitable frame if desired. Pintles 26 provide for pivotal mounting of the directional viewing device in the bracket 22. Strips 27 secure the bracket 22 to bands 28 which clip on the mirror 16. The directional viewing device 24 may be positioned as shown in FIG. 1 or 3 or in intermediate positions.

Figure 4:
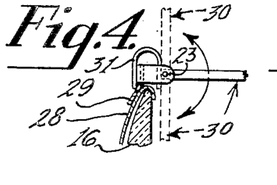
FIG. 4 is a view in sectional side elevation of a modified bracket.

FIG. 4 of the drawing shows a modified arrangement for positioning a directional viewing device 30, similar to the directional viewing device 24, in any one of three positions. A bracket 29 is similar to the bracket 22. Member 31 is a spring of U-shape which bears against the flat edge of the directional viewing device 30, or its sides, to hold it in any one of the positions shown.

Figure 5:
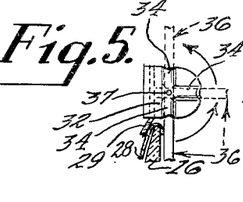
FIG. 5 is a view similar to FIG. 4 of a further modification.

FIG. 5 is similar to FIG. 4 and shows a holder 32. One of these is positioned at each end of the mirror and they may be joined to or be parts of an integral bracket. The holders 32 have detents 34 to cooperate with the edges of the directional viewing device 36. Pintles 37 provide pivotal connection for the directional viewing device 36.

Figures 6, 6A, 7:
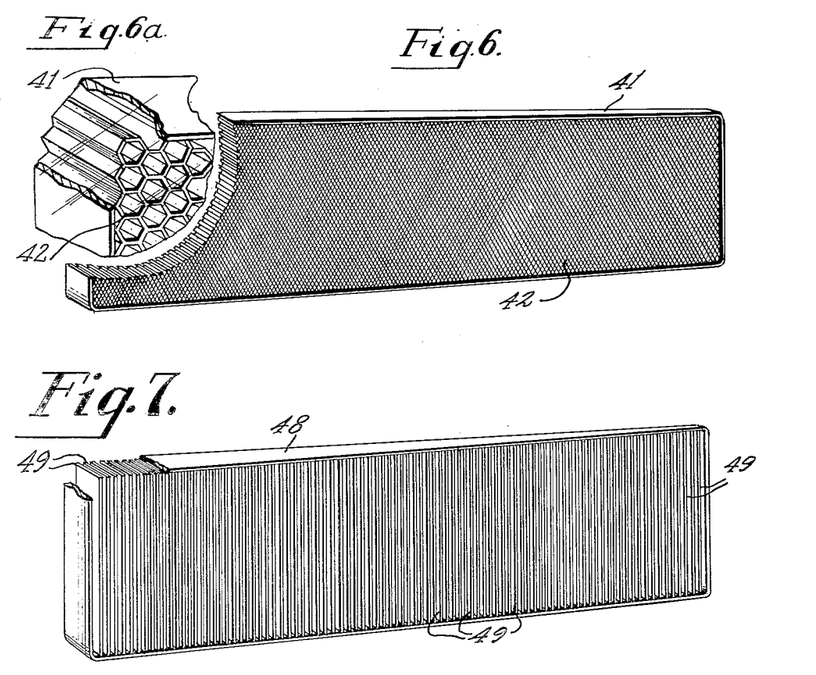
FIGS. 6, 7 and 8 show directional viewing devices to be employed in the combination of FIG. 1.
FIG. 6a shows the cellular structure used in FIG. 6 in more detail to an enlarged scale.

FIGS. 6 to 9 disclose cellular structures useable as the directional viewing devices 24, 30 and 36. FIG. 6 shows a cellular structure 42 surrounded by a frame 41.

In FIG. 6a the cellular structure used in FIG. 6 is shown in more detail to an enlarged scale. A hexagonal honeycomb structure is employed which is, preferably, of minimum wall thickness. The walls are rendered light absorbing.

In a directional viewing device of the cellular type as shown in FIG. 6, each individual cell has a viewing angle through which light can be transmitted. This viewing angle is determined by the geometry of the cell. If, for example, the depth of the cell is equal to the distance between the parallel walls of the cell, the angle measured between a perpendicular to the surface of the cellular structure and the point at which no light will pass through the cell will be 45°. If the cell depth is increased to twice the distance between the walls the cutoff angle will be approximately 26° and if the depth is made three times the wall to wall spacing the cutoff angle will be decreased to approximately 18°. Thus by varying the depth of the cells in a cellular structure such as shown in FIG. 6 any desired cutoff or viewing angle can be achieved. By varying the cell depth from one side of the structure to the opposite side the viewing angle of the cells can be caused to change progressively from one side to the other. This is an important feature of the present invention.

Likewise, if the depth of the cells is kept constant the spacing between cell walls can be varied to control the viewing angle. The directional viewing device illustrated by FIG. 8 makes use of a variation in the spacing between cell walls to achieve a change in viewing angle from one side of the device to the opposite side. In FIGS. 6 and 7 this variation in viewing angle is obtained by varying the cell depths.

Figure 9:
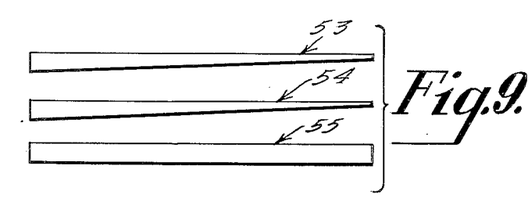
FIG. 9 illustrates top views of the directional viewing devices of FIGS. 6, 7 and 8, respectively.

The top member 53 of FIG. 9 shows the configuration of the directional viewing device 42 in top plan. The taper shown in FIG. 9 is of the order of three to one and provides a corresponding change in viewing angle from one side of the device to the opposite side.

Figures 16, 17, 18:
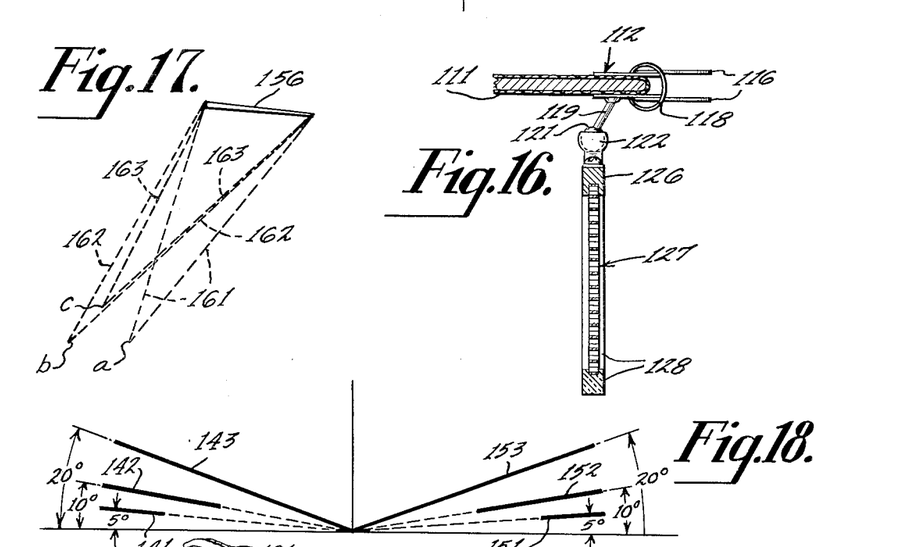
FIG. 16 shows a side view of the clamp and sun visor of FIG. 15.
FIG. 17 is a diagram illustrating principles of the invention as applied to a rear view mirror.
FIG. 18 is a diagram illustrating principles of the invention as applied to a sun visor.

The reason for this variation in viewing angle will be apparent from FIG. 17 in which 156 is a rear view mirror equipped with a directional viewing device of this invention. The letters a, b, and c indicate three locations in which the operator of a vehicle may position his right eye. The right eye is used in this illustration for simplicity since it will be the controlling factor in the operation of the directional viewing device as it is nearer to the device than the left eye. It will be apparent that in position a, a substantial difference exists between the angles formed by the lines 161 at the right hand end and left hand end of 156, the rear view mirror and directional viewing device combination. In typical vehicles, the position of the rear view mirror, its length and the position of the vehicle operator are such that the angles for the position a and the right and left hand ends of device 156 and a perpendicular to the surface of 156 are approximately 10° and 35° respectively. Thus in order to see an image through the directional viewing device in the right hand end of the mirror combination 156 the viewing angles of the elements at this end of 156 will have to exceed 35°. Likewise, the viewing angles at the left hand end will need to be greater than 10°. If the directional viewing device is provided for example with viewing angles of 15° and 45° at the left hand and right hand ends respectively of the mirror combination 156, it will be possible to view images reflected by the mirror from position a. Let us assume that the operator of the vehicle moves to the left so that his right eye assumes the position b. At this position the viewing angles of 15° and 45° for the ends of the mirror combination 156 have been exceeded and light cannot be reflected from the mirror to the eyes of the vehicle operator. Thus by moving between positions a and b the vehicle operator can either see objects in the rear view mirror or cut off all light therefrom so that the blinding effect of headlights is avoided. Position c shown in FIG. 17 illustrates the fact that by moving slightly forward as well as to the left, the total distance required to cut off light from the mirror is reduced.

Thus in order to have the entire area of the directional viewing device in the combination 156 which is representative of the directional viewing device 24 in FIG. 1 cut off all light or black out uniformly over the entire mirror area, it is necessary that the viewing angles of the cells in the directional viewing device vary from approximately 15° at the left hand end to 45° at the right hand end. If the directional viewing device had the same viewing angles over its entire area, the cut off or black out effect would begin at the right hand end of 156 and move progressively across the mirror as the vehicle operator moved from a to b and the distance a to b would have to be increased substantially to cut off light from the entire mirror area. In a practical embodiment of the invention in which an 8½ inch rear view mirror was used, the distance a to b was 5 inches and the distance a to c was 3½ inches. The intensity of the image reflected by the mirror in the 156 combination can be controlled by occupying positions intermediate between a and b or a and c.

FIG. 7 of the drawing shows a modified directional viewing device composed of thin strips of material 49 in a frame 48. These strips of material are thin with respect to their longitudinal spacing and their surfaces are light-absorbing. In FIG. 7, the strips of material 49 are uniformly spaced. The directional viewing device in FIG. 7 is represented in its top plan view by the member 54 in FIG. 9 of the drawing and has a taper of approximately 3 to 1. It is obvious that the range of taper for the devices of FIGS. 6 and 7 will be determined by such factors as the length of the rear view mirror and its position in relation to the vehicle operator.

Figure 8:
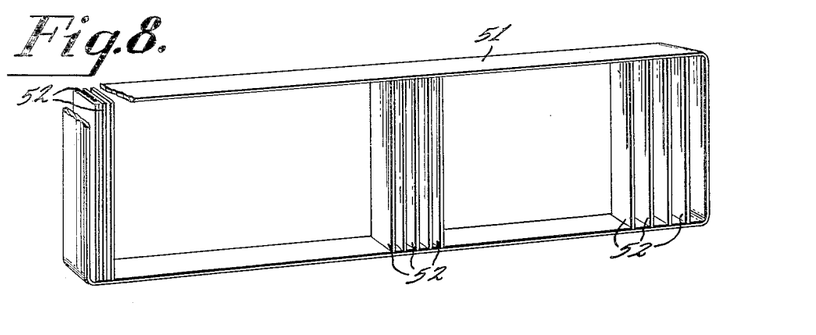

FIG. 8 of the drawing shows another modified directional viewing device composed of thin strips of material 52 in a frame 51. The spacing between the strips of material 52 increases uniformly and progressively toward the right as viewed in FIG. 8 of the drawing. The member 55 of FIG. 9 of the drawing shows the frame 51 in outline in top plan.

While certain specific types of cellular structures have been illustrated in FIGS. 6, 7 and 8, it will be apparent that a wide range of cellular configurations may be employed to obtain the desired directional characteristics. For example, a structure similar to FIG. 6 but having the cells elongated in a vertical direction will function satisfactorily.

It will be apparent that the cellular structures shown in FIGS. 6, 7 and 8 can be enclosed in a plastic material and still retain their directional properties.

Although the directional viewing devices illustrated in FIGS. 1 to 5 are in a form suitable for attachment to a conventional rear view mirror, it is obvious that the directional viewing device arrangements in FIGS. 1 to 5 can be incorporated in rear view mirrors as originally produced without the need for an attachment.

Figures 19, 20:
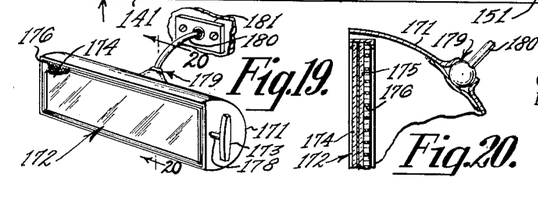
FIG. 19 shows a rear view mirror embodiment of the invention suitable for installation in cars as standard equipment.
FIG. 20 is a sectional view of the rear view mirror of FIG. 19.

FIGS. 19 and 20 show another embodiment of the invention which provides an attractive rear view mirror and directional viewing device combination. This arrangement makes use of a double-faced mirror, one side of which is covered by a directional viewing device of this invention. Referring to FIGS. 19 and 20 two mirrors for example with their reflective surfaces placed back to back are shown. A directional viewing device in the form of a cellular structure 176 covers the exterior surface of the mirror 175 so that light reflected by this mirror must pass through the directional viewing device. The directional viewing device 176 may be similar to that shown in FIGS. 6, 7 and 8. A knob or handle 173 is attached to the mirror assembly 172 by means of a shaft 178 which extends through the housing 171. A suitable pivoting means supports the other end of the mirror assembly 172. Rotating the knob 173 causes the mirror assembly 172 to rotate so that either the plain mirror surface 174 for daylight use or the mirror surface 175 covered by the directional viewing device 176 for night use can be exposed. A detent arrangement of any known type holds either mirror surface in the proper viewing position after the knob 173 has been manipulated. The housing 171 is of suitable form to permit the mirror assembly 172 to rotate 180°. A ball and socket joint 179, support arm 180 and mounting plate 181 are employed to attach the rear view mirror to a suitable part of the vehicle.

Figure 10:
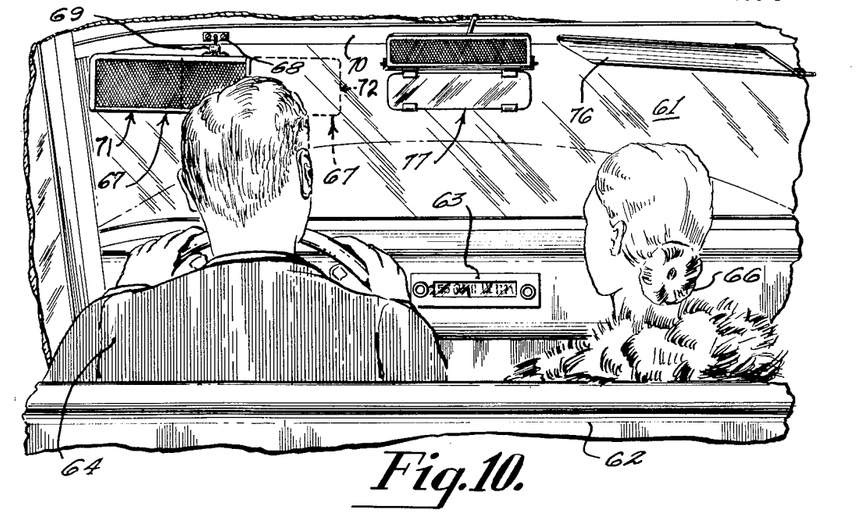
FIG. 10 is a pictorial showing of a sun visor embodying the invention in use, as well as a rear view mirror combination like or similar to that shown in FIG. 1.

FIG. 10 of the drawing, like FIG. 1, shows the front compartment of an automobile having a windshield 61, a front seat 62 and an instrument panel 63. Reference character 64 indicates a seated figure at the left of the automobile. A seated figure at the right is designated 66. The seated figure 64 represents the driver who, when operating the vehicle at night time has available for his use a rear view mirror 77 which may be like the mirror 16 of FIG. 1.

Figures 12, 13, 14:
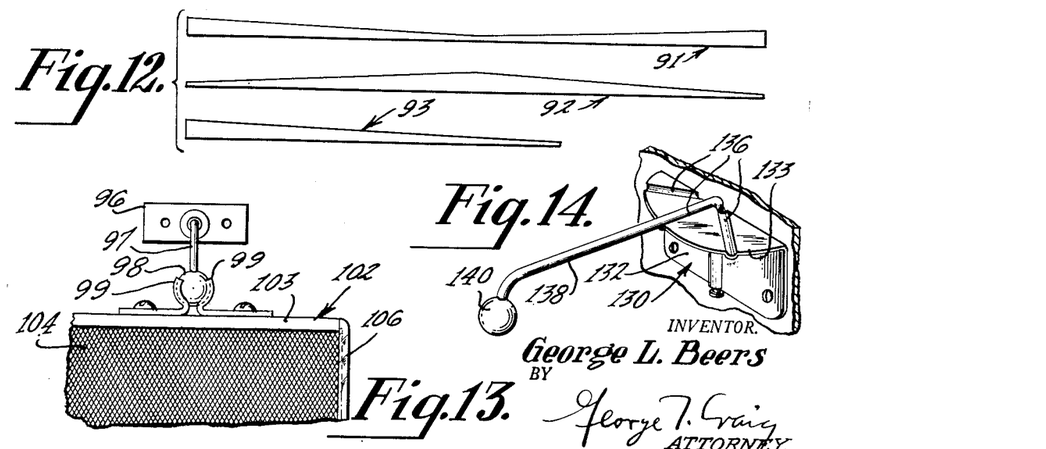
FIG. 12 discloses directional viewing devices in plan view for use in connection with sun visors of the present invention.
FIG. 13 shows a further modified form of a sun visor embodying the invention.
FIG. 14 shows a bracket arrangement for permanent installation in a vehicle of a sun visor embodying the invention.

In conditions of brilliant sunshine or direct sunlight, the driver 64 will resort to the sun visor of this invention. This sun visor comprises a directional viewing device 67 and a support 68. The support 68 is mounted on the top rail 70 of the windshield 61 of the vehicle. The directional viewing device 67, although of larger area, is similar in some respects to the device 24 of FIG. 1 of the drawing. Referring to FIG. 6 of the drawing, the directional viewing device 67 is similar to that shown in FIG. 6 in that it has a similar taper and employs essentially the same cellular structure. The member 93 in FIG. 12 shows the directional viewing device 67 in top plan. As shown in FIG. 10, the device 67 is carried by a ball and socket combination 69. The directional viewing device 67 may be placed as shown by full lines 71 from which position it may be rotated 180° in a horizontal direction to the position shown by the dotted lines 72 as the course of the vehicle changes with respect to the directions of the sun rays.

This provision for rotating the sun visor through 180° in a horizontal direction makes it possible to use a relatively short sun visor which in addition to its other novel characteristics enables it to black out the rays of the sun or light from any other intense source and at the same time provide a much wider range of unobstructed vision than heretofore achieved. With the sun visor as shown in FIG. 10, in the position as shown by the full lines 71, the operator of the vehicle 64 can see through the sun visor without obstruction. In this position the surface of the sun visor is essentially perpendicular to his line of vision. As previously stated, the cellular structure of the sun visor is similar to the structure of FIG. 6 in which the viewing angles of the elements vary progressively from one side to the opposite side. The directional viewing device 67 is so mounted that the cells with the narrowest viewing angles are farthest from the ball and socket connection 69. If the directional viewing device 67 is now rotated in a horizontal direction so that the left hand end in the position 71 moves away from the vehicle operator 64, the cells at the left hand end will black out or cut off all light which might reach the eyes of the vehicle operator through this area. As the directional viewing device 67 is rotated further away from the vehicle operator the blacked out area will increase progressively until the entire area is blacked out. The vehicle operator, however, can still see through that portion of the area which is not blacked out. With the sun visor in the position 71, the area to the right of the visor is, of course, unobstructed and; likewise, when the sun visor is in the position 72 the area to the left of the sun visor is unobstructed. Thus by using a relatively short sun visor of this unique design, it is possible to prevent the sun's rays from reaching the eyes of the vehicle operator with a minimum obstruction of his viewing range. FIG. 18 illustrates the relationship between the blacked out area and the angle of rotation of the sun visor for one embodiment of the invention. The solid portion of each line indicates the percentage of the area which is blacked out for the angle of rotation which is indicated. Thus line 141 shows 25% of the sun visor area blacked out with the sun visor rotated 5° from the position 71 in FIG. 10. Line 142 shows 50% blacked out for 10° rotation of the sun visor and 100% of the area is blacked out for a 20° rotation. The lines 151, 152 and 153 show the corresponding relationships when the sun visor is in the position 72 in FIG. 10 and is rotated so that the right hand end of the sun visor moves away from the vehicle operator.

The shape of the windshield in some cars may be such that it may be desirable to move the sun visor toward the vehicle operator in order to rotate it 180° in a horizontal direction or from position 71 to position 72 as shown in FIG. 10. The ball and socket connection 69 not only permits the sun visor 67 to be rotated in this manner, but also enables it to be rotated in a vertical direction about a horizontal axis. When viewing scenes or objects through the directional light transmitting elements of the sun visor a slight rotation of a few degrees in a vertical direction is effective in minimizing glare due to scattered light from the sky and objects along the highway with the result that the contrast and color saturation in the scene is improved and the eye strain encountered during long periods of driving is reduced.

Another use permitted by the unique design of the sun visor of this invention is during night time driving on turnpikes or freeways where there is no cross traffic. The sun visor can be adjusted from the position 71 so that an area on the left side of the driver is blacked out with the result that the intense light from the headlights of cars travelling in the opposite direction is reduced to such an extent that the blinding effect on the vehicle operator is eliminated.

In a further application of the principles of this invention the directional viewing device 67 of FIG. 10 may be tapered in a vertical direction as well as the horizontal direction shown in FIG. 6. In such an embodiment of the invention the cells at the top of the directional viewing device 67 have the narrowest viewing angles and the viewing angles of the cells vary progressively from top to bottom. Thus when the sun visor 67 is provided with the vertical taper and is rotated in a vertical direction, the cells at the top of the directional viewing device black out first and the blacked out area increases progressively from top to bottom with further rotation of the sun visor 67 in the vertical direction. Thus by rotating the sun visor 67 in both a horizontal and vertical direction even greater selectivity is provided in enabling the vehicle operator to black out only a limited area to prevent the blinding effect of intense light sources and provide a maximum of unobstructed field of vision.

An ordinary and usually ineffective, sun visor 76 is shown in its inoperative position. Such sun visors are generally mounted so that they can be shifted around to a position at right angles to that shown in FIG. 10 so that the sun's rays coming in the side window can be blocked out to some extent.

Figure 11:
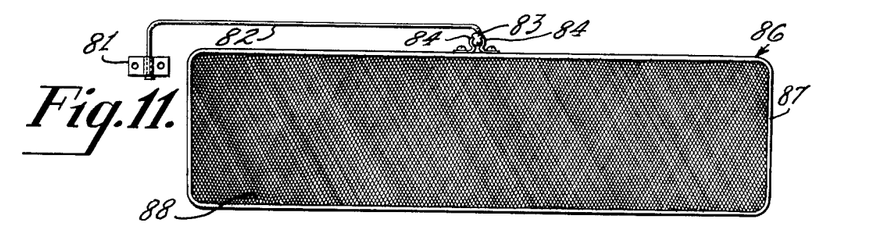
FIG. 11 shows a modification of a sun visor embodying the present invention.

FIG. 11 shows a directional viewing device type of sun visor which can be used either in front or at the side of the viewer. In FIG. 11, a clip or bracket 81 is secured to any desired part of the vehicle. The arm 82 is swiveled in the part 81 so that it may swing in a given plane. For purposes of this description, a horizontal plane is assumed. The arm 82 terminates in a ball 83 received in a part 84 secured to the frame 87 which holds the cellular structure 88 of the directional viewing device 86. Cellular structures shown in top plan view by the parts 91 and 92 of FIG. 12 may be used as the directional viewing device 86. The cellular structure 91 when positioned in front of the viewer functions in a similar manner to the sun visor 67 of FIG. 10. With the sun visor 86 of FIG. 11, however, it is not necessary to rotate the sun visor through 180° to black out the sun's rays on either side of the viewer. Either the right hand side or the left hand side of the viewer is blacked out by rotating the respective ends of the sun visor 86 away from the viewer. The sun visor 86 is of substantially larger area than the sun visor 67 of FIG. 10. By rotating the arm 82 to position the sun visor 86 at one side of the viewer the sun's rays when coming from that side can be blacked out by rotating the sun visor in a vertical direction about the horizontal axis provided by the ball and socket combination 83, 84. A cellular structure shown in top plan view by the part 92 in FIG. 12 can also be used as the directional viewing device 86. This configuration of the cellular structure causes the area on either side of the viewer to black out uniformly as the sun visor is rotated away from the viewer. When positioned at the side of the viewer it will likewise black out the sun's rays when rotated in a vertical direction.

FIG. 13 shows in greater detail the ball and socket connection and mounting arrangement designated 69 and 68 for the sun visor 67 in FIG. 10. Referring to FIG. 13, 98 and 99 are the ball and socket connection for supporting the sun visor 102 of which only a portion is shown. The sun visor 102 is similar to the sun visor 67 of FIG. 10. The parts 99 of the ball and socket connection are fastened to the member 103 of the sun visor frame by any suitable means such as the screws shown in the illustration. The parts 99 may be slotted, if desired, so that by releasing the screws the parts 99 may be brought closer together to increase the pressure on the ball 98 and the screws again tightened to maintain this pressure. In FIG. 13, 97 is the supporting arm for the ball 98. The other end of the arm 97 is attached to the mounting support 96. The cellular structure 104 is supported in grooves in the frame members 103 and 105. The member 105 is preferably of transparent material so that it does not interfere with the vehicle operator's vision. The member 103 can also be made of transparent material, but can be made of opaque material if this is desired for structural reasons. The ball and socket connection illustrated in FIG. 13 permits the sun visor to be rotated through an angle greater than 180° in a vertical direction which is necessary to permit the sun visor to be positioned near the roof of the vehicle when its use is not required.

It will be obvious to those skilled in the art that a variety of mounting arrangements may be employed to permit the sun visor to be rotated about both a horizontal and a vertical axis. Another mounting arrangement employing a ball and socket connection is illustrated in FIG. 14. This arrangement is intended for use with a sun visor similar to the sun visor 67 of FIG. 10. It permits the ball and socket connection to be attached at the center of the sun visor instead of near one end as shown in FIG. 10. Referring to FIG. 14 the arm 138 which supports the ball 140 is bent at right angles so that it can rotate in a groove formed in the vertical portion 132 of the mounting bracket 130. The mounting bracket 130 is formed with a horizontal member 133 in which there are three recesses 136 which serve as detents to position the arm 138 in either of the three positions as desired. The mounting bracket of FIG. 14 mounts above the windshield directly in front of the vehicle operator. The arrangement shown in FIG. 14 thus makes it possible to shift the vertical axis about which the sun visor rotates to either the left, the right or in the center of the vehicle operator's position. From these positions the sun visor is operated in the manner discussed with reference to FIG. 10.

By means of the mounting bracket shown in FIG. 14 and a sun visor similar to 67 shown in FIG. 10, but with the ball and socket connection attached to the center of the sun visor, it is possible to rotate the sun visor through 180° so that the cells having the narrowest cut off angles are directly in front of the vehicle operator. The arm 138 in FIG. 14 is positioned in either the right or left recess of the three recesses 136 to permit the sun visor to be used in this manner. Under these conditions rotating the end of the sun visor directly in front of the vehicle operator away from the vehicle operator will cause the cells in that end of the sun visor to black out. By this means it is possible to black out any desired area directly in front of the vehicle operator and leave the area on both sides of the vehicle operator substantially unobstructed.

Figure 15:
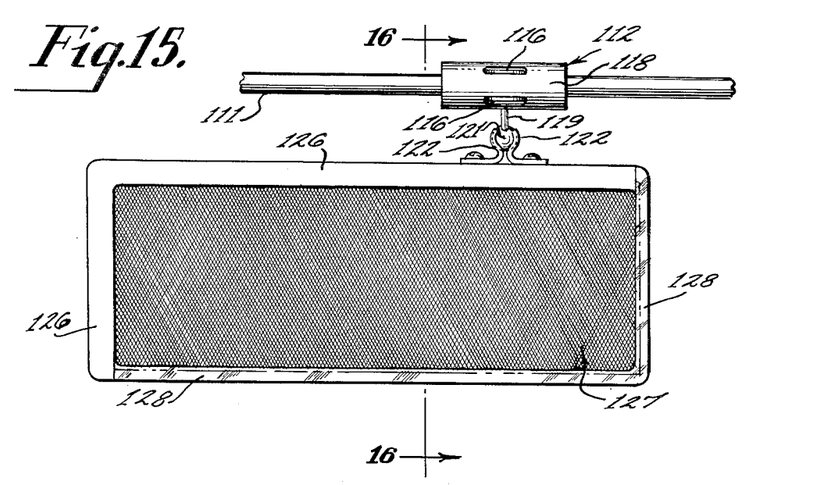
FIG. 15 shows the sun visor aspect of the present invention in an embodiment suitable for attachment by means of a clamp to a conventional sun visor in a vehicle.

FIGS. 15 and 16 show an adaptation of the sun visor which as an accessory can be fastened to conventional sun visors in vehicles by means of a clamp so that it can be used in a manner similar to that discussed in connection with the sun visor 67 of FIG. 10. Referring to FIGS. 15 and 16 the cellular structure 127 which is comprised of a plurality of directional light transmitting elements is supported in a frame composed of the members 126 and 128. The member 128 is preferably of a transparent material so that it does not obstruct the vision of the vehicle operator. Member 126 may be made of either transparent or opaque material as desired. The ball and socket connection consisting of the members 121 and 122 is similar to ball and socket connection 98 and 99 in FIG. 13. The ball 121 is attached to one end of the arm 119 the other end of which is fastened to one of the members 116 which are a part of the clamp 112. The clamp 112 is formed by the two members 116 and the spring 118 which tends to force the left hand end of the members 116 as shown in FIG. 16 together so that they hold firmly to the conventional sun visor 111 only a portion of which is shown. Pressure exerted to force the right hand ends of 116 together will release the clamp and the directional viewing device sun visor can be detached from the conventional sun visor 111.

What is claimed is:

1. A rotatable directional viewing device for viewing objects therethrough supported in front of a viewing position by means to permit its rotation about an axis and comprising a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements changing progressively from one end of said device toward the axis about which said device is rotatable so that the area through which objects can be viewed from the viewing position can be decreased progressively in a direction toward the axis about which the said directional viewing device is rotatable.

2. In combination a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements changing progressively from one end of said reflecting surface to the other so that the reflecting surface of said mirror can be viewed in the normal manner from the viewing position and the light reflecting surface of said mirror cannot be seen from a slightly different position.

3. In combination a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements predetermined so that the reflecting surface of said mirror can be viewed in the normal manner from the viewing position and the light reflecting surface of said mirror cannot be seen from a slightly different position.

4. In combination a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and are substantially perpendicular to the said reflecting surface of said mirror and the cut off angles of said directional light transmitting elements so predetermined that the reflecting surface of said mirror can be viewed in the normal manner from the viewing position and the light reflecting surface of said mirror cannot be seen from a slightly different position.

5. A rotatable directional viewing device for viewing objects therethrough supported in front of a viewing position by means to permit its rotation about a first axis and a second axis at right angles to said first axis and comprising a plurality of adjacent light transmitting elements having directional properties in at least two directions at right angles to each other, each light transmitting element having a predetermined cut off angle beyond which substantially no light can pass through said elements, said adjacent light transmitting elements oriented so that their light transmitting paths are substantially parallel and the cut off angles of said light transmitting elements changing progressively from one end toward said first axis about which said directional viewing device is rotatable so that the area through which objects can be viewed from the viewing position may be decreased progressively in a direction toward said first axis as said directional viewing device is rotated about said first axis.

6. A rotatable directional viewing device for viewing objects therethrough supported in front of a viewing position by means to permit its rotation about two axes at right angles to each other and comprising a plurality of adjacent light transmitting elements having directional properties in at least two directions corresponding to the two axes at right angles to each other, each light transmitting element having a predetermined cut off angle beyond which substantially no light can pass through said elements, said adjacent light transmitting elements oriented so that their light transmitting paths are substantially parallel and the cut off angles of said light transmitting elements changing progressively from one end of said directional viewing device toward one of the axes about which said directional viewing device is rotatable so that the area through which objects can be viewed from the viewing position can be decreased progressively in the direction in which the cut off angles of said adjacent light transmitting elements changes progressively as said directional viewing device is rotated about the axis toward which the cut off angles of said light transmitting elements changes progressively.

7. A rotatable directional viewing device for viewing objects therethrough supported in front of a viewing position by means to permit its rotation about an axis within the area of said directional viewing device and comprising a plurality of adjacent directional light transmitting elements, each having a predetermined cut off angle beyond which substantially no light can pass through said elements, said adjacent directional light transmitting elements oriented so that their light transmitting paths are substantially parallel and perpendicular to a plane included within the area of said directional viewing device and the cut off angles of said directional light transmitting elements changing progressively from one end of said viewing device and means permitting the rotation of said directional viewing device about a second axis, said second axis being at right angles to said first named axis.

8. In combination a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements increasing progressively from an end of said reflecting surface nearest the viewing position to the opposite end so that the reflecting surface of said mirror can be viewed in the normal manner from the viewing position and the light reflecting surface of said mirror cannot be seen from a slightly different position.

9. In combination, a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements changing progressively from one end of said mirror to the other as a function of the distance of said light transmitting elements from the viewing position.

10. In combination, a mirror having a reflecting surface for viewing objects to the rear of a viewing position, means associated with said reflecting surface and including a plurality of adjacent directional light transmitting elements, each having a predetermined cut off angle beyond which substantially no light can pass through said elements, said adjacent directional light transmitting elements oriented so that their light transmitting paths are substantially parallel and the cut off angles of said directional light transmitting elements increasing progressively from one end of said mirror to the other as the distance between said elements and the viewing position increases.

11. A rotatable directional viewing device for viewing objects therethrough supported by means to permit its rotation about an axis in front of a viewing position and comprising a plurality of adjacent directional light transmitting elements in the form of a cellular structure, each adjacent directional light transmitting element having a predetermined cut off angle as determined by the depth of the cell in relation to the space between the cell walls, beyond which substantially no light can pass through said elements, said adjacent directional light transmitting elements oriented so that their light transmitting paths are substantially parallel and perpendicular to a plane which includes the axis about which said directional viewing device is rotatable and the depth of the cells in relation to the spaces between the cell walls so proportioned that the area through which objects can be viewed can be decreased progressively in a direction toward the axis about which the said directional viewing device is rotatable.

12. A rotatable directional viewing device for viewing objects therethrough supported by means to permit its rotation about an axis in front of a viewing position and comprising a plurality of adjacent directional light transmitting elements in the form of a cellular structure, each adjacent directional light transmitting element having a predetermined cut off angle, as determined by the depth of the cell in relation to the space between the cell walls, beyond which substantially no light can pass through said elements, said adjacent directional light transmitting elements oriented so that their light transmitting paths are substantially parallel and perpendicular to a plane which includes the axis about which said directional viewing device is rotatable and the depth of the cells in relation to the spaces between the cell walls changing progressively from one end of said device toward the axis about which said device is rotatable.

13. In combination, a mirror having a reflecting surface for viewing objects to the rear of a viewing position and means associated with and superimposed upon said reflecting surface and including a plurality of spaced thin parallel strips of opaque material, said strips having one edge near said reflecting surface, the surfaces of said strips being substantially perpendicular to said reflecting surface and to the longest dimension of said mirror, and the dimensions of the surfaces of said strips which are perpendicular to said reflecting surface and the spaces between said strips so proportioned that the reflecting surface of said mirror can be seen in the normal manner from the viewing position but the reflecting surface of said mirror cannot be seen from a slightly different position.

14. In combination, a mirror having a reflecting surface for viewing objects to the rear of a viewing position and means associated with and superimposed upon said reflecting surface and including a plurality of spaced thin parallel strips of opaque material, said strips having one edge near said reflecting surface, the surfaces of said strips being substantially perpendicular to said reflecting surface and to the longest dimension of said mirror and the dimensions of the surfaces of said strips which are perpendicular to said reflecting surface in relation to the spaces between said strips decreasing progressively from one end of said mirror to the opposite end so that the reflecting surface of said mirror can be seen in the normal manner from the viewing position but the reflecting surface of said mirror cannot be seen from a slightly different position.

15. In combination, a mirror having a reflecting surface for viewing objects to the rear of a viewing position and means associated with and superimposed upon said reflecting surface and including a plurality of spaced thin parallel strips of light absorbing opaque material, the spaces between said strips being substantially greater than the thickness of said strips, said strips having one edge near said reflecting surface, the surfaces of said strips being substantially perpendicular to said reflecting surface and to the longest dimension of said mirror, and the dimensions of the surfaces of said strips which are perpendicular to said reflecting surface and the spaces between said strips so proportioned that the reflecting surface of said mirror can be seen in the normal manner from the viewing position and the reflecting surface of said mirror cannot be seen from a slightly different position.

16. A rotatable directional viewing device for viewing objects therethrough supported in front of a viewing position by means to permit its rotation about an axis and comprising a plurality of adjacent directional light transmitting elements, each having a predetermined cut off angle beyond which substantially no light can pass through said elements, said adjacent directional light transmitting elements oriented so that their light transmitting paths are substantially parallel and said cut off angles decreasing progressively on each side of said axis about which said directional viewing device is rotatable.

17. A rotatable directional viewing device for viewing objects therethrough supported in front of a viewing position by means to permit its rotation about an axis and comprising a plurality of adjacent directional light transmitting elements, each having a predetermined cut off angle beyond which substantially no light can pass through said elements, said adjacent directional light transmitting elements oriented so that their light transmitting paths are substantially parallel and said cut off angles increasing progressively on each side of said axis about which said directional viewing device is rotatable.

18. In combination a mirror having on one side a reflecting surface and on the opposite side a reflecting surface and means to permit either surface of said mirror to be viewed from a viewing position, a plurality of spaced thin parallel strips of opaque material superimposed on said second reflecting surface, said strips having one edge near said reflecting surface, the surfaces of said strips being perpendicular to said second reflecting surface and to the longest dimension of said mirror and the dimensions of the surfaces of said strips which are perpendicular to said second reflecting surface and the spaces between said strips so proportioned that the second reflecting surface of said mirror can be seen in the normal manner from the viewing position but the said second reflecting surface of said mirror cannot be seen from a slightly different position.

19. In combination, a mirror having a reflecting surface for veiwing objects to the rear of a viewing position and means associated with and superimposed upon said reflecting surface and including a plurality of spaced thin parallel strips of opaque material, said strips having one edge near said reflecting surface, the surfaces of said strips being substantially perpendicular to said reflecting surface and to the longest dimension of said mirror, and the relationship between the dimensions of the surface of said strips which are perpendicular to said reflecting surface and the space between said strips changing progressively as a function of the distance of said strips from the viewing position.

20. A rotatable directional viewing device for viewing objects therethrough supported in front of a viewing position by means to permit its rotation about two axes at right angles to each other and comprising a plurality of adjacent light transmitting elements having directional properties in at least two directions corresponding to the two axes at right angles to each other, each light transmitting element having a predetermined cut off angle beyond which substantially no light can pass through said elements, said adjacent light transmitting elements oriented so that their light transmitting paths are substantially parallel and the cut off angles of said light transmitting elements changing progressively from one end of said directional viewing device toward one of the axes about which said directional viewing device is rotatable and changing progressively away from the other axis about which said directional viewing device is rotatable.

References Cited in the file of this patent

UNITED STATES PATENTS

| | | |
|---|---|---|
| 1,990,222 | Burlein | Feb. 5, 1935 |
| 2,074,247 | Armstrong | Mar. 16, 1937 |
| 2,398,799 | Miller | Apr. 23, 1946 |
| 2,637,246 | Wolk | May 5, 1953 |
| 2,755,700 | Ljungstrom | July 24, 1956 |
| 2,942,254 | Beers | June 21, 1960 |

FOREIGN PATENTS

| | | |
|---|---|---|
| 32,535 | France | Sept. 6, 1927 |
| 1,028,476 | France | Feb. 25, 1953 |
| 1,051,780 | France | Jan. 19, 1954 |
| 1,112,227 | France | Nov. 9, 1955 |
| 476,122 | Germany | May 8, 1929 |
| 560,642 | Germany | Sept. 17, 1930 |
| 233,484 | Great Britain | May 14, 1925 |
| 489,442 | Great Britain | July 26, 1938 |
| 781,589 | Great Britain | Aug. 21, 1957 |
| 347,370 | Italy | Apr. 7, 1937 |
| 280,883 | Switzerland | Feb. 15, 1952 |